United States Patent [19]

Kawai et al.

[11] Patent Number: 5,047,882
[45] Date of Patent: Sep. 10, 1991

[54] ROTARY HEAD CYLINDER FOR VIDEO TAPE RECORDER

[75] Inventors: Hiroyoshi Kawai, Katsuta; Tsutomu Masumoto, Toukai; Yoshio Manabe, Hitachi; Tsunenori Iwama, Naka; Shinji Ozaki, Funabashi, all of Japan

[73] Assignee: Hitachi, Ltd., Tokyo, Japan

[21] Appl. No.: 528,761

[22] Filed: May 25, 1990

[30] Foreign Application Priority Data

May 26, 1989 [JP] Japan ................. 1-131321

[51] Int. Cl.$^5$ ................ G11B 5/53; G11B 21/18; G11B 21/24
[52] U.S. Cl. ................................. 360/107
[58] Field of Search ................ 360/107, 108, 109

[56] References Cited

U.S. PATENT DOCUMENTS

| | | | |
|---|---|---|---|
| 4,611,255 | 9/1986 | Ushiro et al. | 360/107 |
| 4,725,910 | 2/1988 | Kaku et al. | 360/107 |
| 4,823,211 | 4/1989 | Schulz et al. | 360/108 |
| 4,829,401 | 5/1989 | Vranken | 360/108 |
| 4,835,645 | 5/1989 | Ohji et al. | 360/108 |

FOREIGN PATENT DOCUMENTS 62-208409  9/1987  Japan .

Primary Examiner—Robert S. Tupper
Attorney, Agent, or Firm—Antonelli, Terry, Stout & Kraus

[57] ABSTRACT

Described herein is a rotary head cylinder assembly including a fixed lower cylinder for guiding travel of a magnetic tape, an upper cylinder rotatably mounted on the lower cylinder and provided with a number of magnetic heads, and a circuit board fixedly mounted on the upper cylinder and supporting thereon amplifiers in positions in close proximity to the respective magnetic heads. The circuit board is provided with notched portions at the outer periphery to permit direct access to screws for adjusting the height of the magnetic heads as well as to holes for adjusting the position of the magnetic heads from above the top side of the cylinder, while preventing interference by undesirable signals.

4 Claims, 3 Drawing Sheets

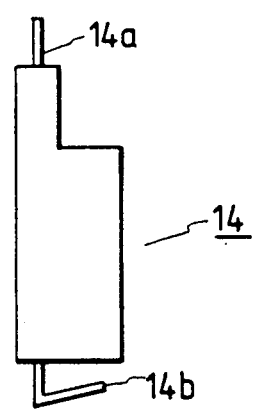
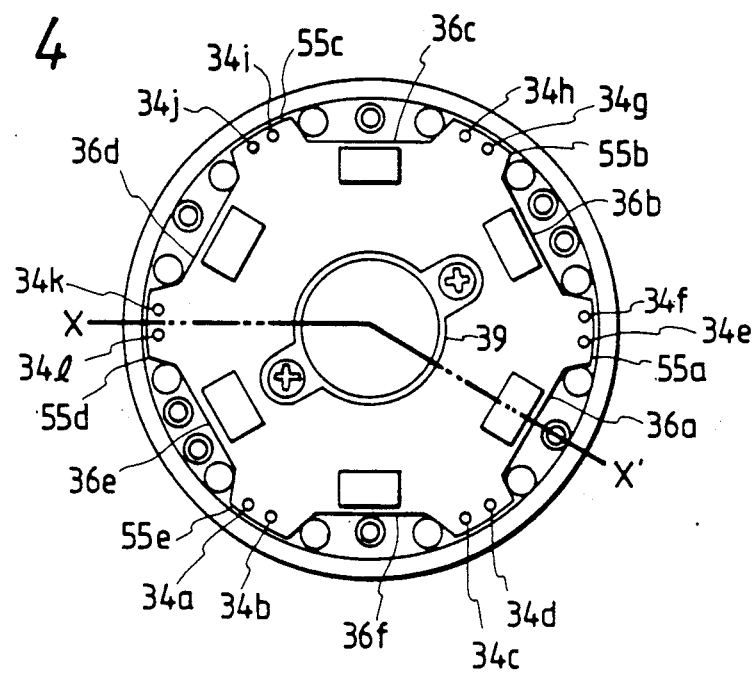
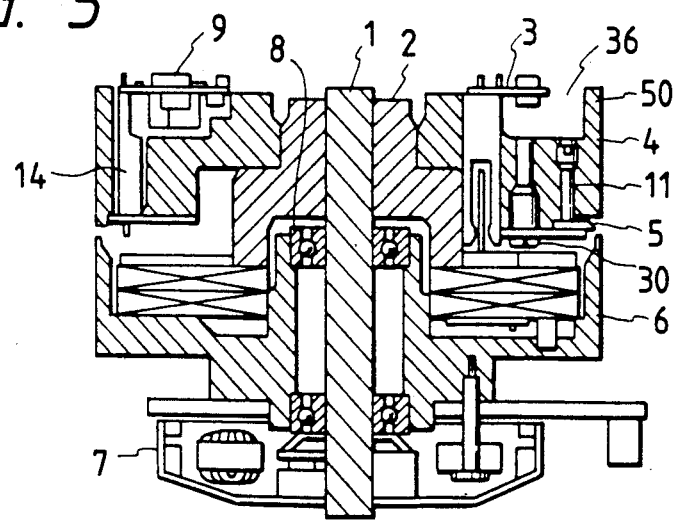

ROTARY HEAD CYLINDER FOR VIDEO TAPE RECORDER

BACKGROUND OF THE INVENTION

1. Field of the Invention

This invention relates to a rotary head cylinder assembly for use on a video tape recorder or the like, and more particularly to a rotary head cylinder assembly of the type which has recording and playback amplifiers mounted thereon.

In the conventional rotary head cylinder assemblies of this sort, it has been the usual practice to divide the amplifier circuit board into two separate circuit boards one for the recording amplifiers and the other one for the playback amplifiers, mounting the two circuit boards on an upper cylinder, for example, on the opposite sides of an intermediate flat portion between the inner and outer peripheries of the upper cylinder.

An example of such conventional rotary head cylinder assemblies is described in Laid-Open Japanese Patent Application 62-208409.

The rotary head cylinder has the magnetic heads mounted thereon in diametrically opposite positions or in positions with a phase difference of 180° from each other, so that it invariably requires adjustments of the magnetic heads into the opposite positions as well as adjustments for equalizing or levelling the magnetic head heights.

The recording and playback amplifier circuit boards in the above-mentioned prior art device are substantially same as the upper cylinder in size, so that it has been necessary to adjustment the magnetic heads into the 180° positions and to a predetermined height before mounting the circuit boards on the upper cylinder. Once the circuit boards are fixed on the upper cylinder, the adjustments of the magnetic heads into the 180° positions and into level positions become very troublesome because the circuit boards have to be removed prior to such adjustments.

SUMMARY OF THE INVENTION

It is an object of the present invention to provide a rotary head cylinder assembly of the sort mentioned above, which is so constructed as to facilitate the adjustment of the magnetic heads into predetermined angular and level positions.

It is another object of the present invention to provide a rotary head cylinder assembly which is easy to assemble and less susceptible to interference of unnecessary signals.

It is still another object of the present invention to provide a rotary head cylinder assembly which permits to replace an upper cylinder without removing a circuit boards with amplifiers located in positions in close proximity to the magnetic heads.

In order to achieve the above-stated objects, the rotary head cylinder of the invention has the following features separately or in combinations.

(1) Notches are provided in outer peripheral portions of a circular circuit board with recording and playback amplifiers located in the proximity of magnetic heads;

(2) Wiring patterns and wire threading holes are provided in notch-free outer peripheral portions of the circuit boards;

(3) The circuit board is located on the inner of a flange at the outer periphery of the upper cylinder;

(4) The notches of the circuit board are positioned to register with positions of magnetic head height adjusting screws on the upper cylinder; and (5) The head height adjusting screws are located on the upper cylinder side by side with magnetic head indexing holes within the areas of the notches in the circuit boards.

In accordance with the present invention, the circular circuit board with recording and playback amplifiers in the proximity of the magnetic heads are provided with notches at its outer periphery in positions registering with positions of magnetic head levelling screws, thereby permitting to insert a universal driver from the top side of the rotary head cylinder for adjustment of the height of the magnetic heads. Besides, the adjustment for the 180° indexing of the magnetic heads can be made simply by inserting an eccentric pin through the notches into indexing holes which are located within the areas of the notches in the circuit board. Further, the circuit board is provided with wiring patterns to be connected to the magnetic heads along with wire threading holes in outer peripheral areas between the notches so that the signal lines from the magnetic heads can be passed vertically through the wire threading holes in an extremely facilitated manner in the assembling process. Accordingly, the upper cylinder can be replaced without necessitating removal of the circuit board from the upper cylinder. In addition, the centering of the circuit board on the upper cylinder is facilitated by the use of arcs along the outer periphery or the inner periphery of the circuit board.

BRIEF DESCRIPTION OF THE DRAWINGS

In the accompanying drawings:

FIG. 3 is a schematic view of a tangential connector 14;

FIG. 4 is a top view of a rotary head cylinder assembly in another embodiment of the invention;

FIG. 5 is a sectional view taken on line X—X' of FIG. 4;

DESCRIPTION OF PREFERRED EMBODIMENTS

Figure 1:
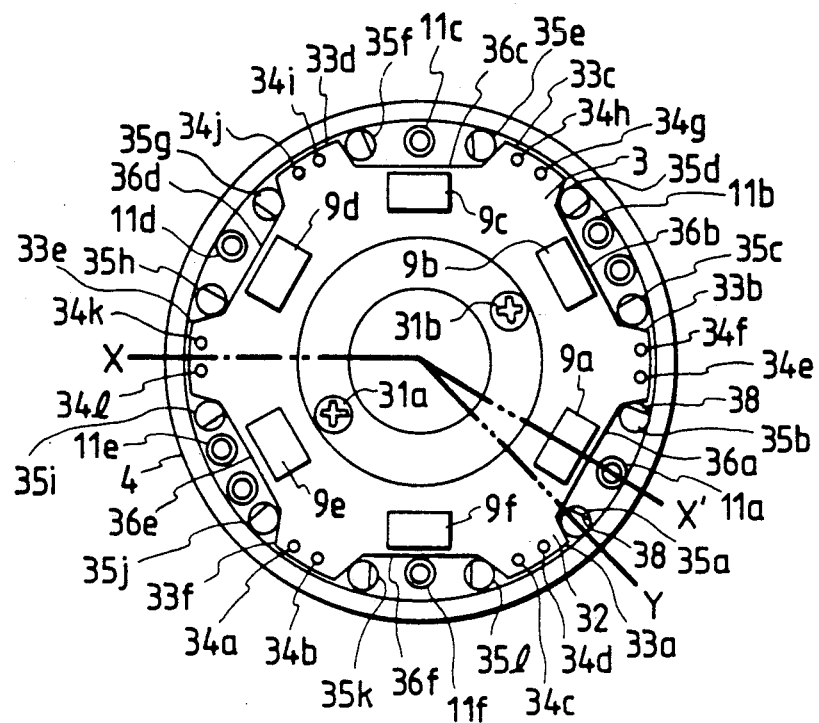
FIG. 1 is a top view of a rotary head cylinder assembly embodying the present inventions.
Figure 2:
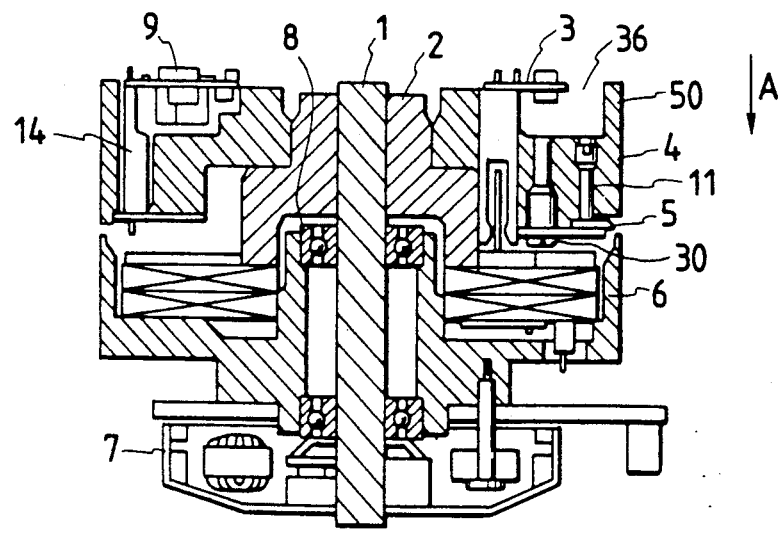
FIG. 2 is a sectional view taken on line X—X' of FIG. 1.

Referring to the accompanying drawings, FIGS. 1 and 2 show an embodiment of the rotary head cylinder assembly according to the invention by way of a top view of the rotary head cylinder assembly and a sectional view taken on line X—X', respectively, the rotary head cylinder assembly including an upper cylinder 4 with magnetic heads 5 fixed thereon by screws 30, a lower cylinder 6 which guides the travel of a magnetic tape (not shown), and a motor 7 for rotating the upper cylinder 4. The upper cylinder 4 is rotated through bearings 8, rotational shaft 1 and disc 2.

The upper cylinder 4 is fixed on the disc 2 by screws 31a and 31b. Fixedly mounted on top of the upper cylinder 4 is a circuit board 3 which supports thereon recording and playback amplifiers 9a to 9f in positions in close proximity to the magnetic heads. The circuit board 3 is located on the inner side of a flange 50 at the outer periphery of the upper cylinder 4 in such a manner as to form gap spaces 33a to 33f of the same lengths between the arcs 32 at the outer periphery of the circuit board 3 and the inner periphery of the outer flange 50. Consequently, the circuit board 3 is positioned concentrically with the upper cylinder 4.

Provided on the upper cylinder 4 are connecting terminals 14 which are connected to the magnetic heads 5 to transfer signals to the circuit board 3. These connecting terminals 14 interconnect the patterns formed in the proximity of the outer periphery of the circuit board 3 with holes 34a to 34e. FIG. 3 shows the details of one of the connecting terminals 14. The upper portions 14a of the connecting terminals 14 are inserted in the holes 34a to 34e of the circuit board 3, and connected to the magnetic heads 5 at the respective lower ends 14b.

Also provided on the upper cylinder 4 are height adjusting screws 11a to 11f for the magnetic heads 5, along with indexing holes 35a to 35e which are located on the opposite sides of each one of the height adjusting screws 11a to 11f, respectively. The circuit board 3 is provided with notches 36a to 36f at its outer periphery at the positions corresponding to the respective sets of the height adjusting screw 11 and indexing holes 35 (or at the positions in phase with the latter when seen in the direction of arrow A).

At the time of turning the screws 11a to 11f for adjustment of the height of the magnetic heads, these screws can be directly accessed by inserting a screwdriver through the notches 36a to 36f in the circuit board 3 which is fixedly mounted in position on the upper cylinder. The holes 35a to 35e on the opposite sides of the height adjusting screws 11 are located in such positions that one can see, through the holes 35, the edges 38 of bases 5a on which the magnetic heads are bonded, when viewed in the direction of arrow A. Accordingly, the adjustment for 180° indexing of the magnetic head position can be made by turning an eccentric pin (not shown) which is inserted in a hole 35 through a notch of the circuit board 3.

The above-described arrangements permit to make the necessary adjustments for levelling and 180° indexing of the magnetic head positions without removing the circuit board 3 from the upper cylinder 4. Besides, the vertical connections of the magnetic heads 5 with the circuit board 3, which has the recording and playback amplifiers 9a to 9f in the proximity of the respective magnetic heads, not only facilitate the assembling work but also permit to shorten the signal lines to prevent interference by unnecessary signals.

FIGS. 4 and 5 illustrate another embodiment of the invention in a top view and a sectional view taken on line X—X', respectively. This embodiment is arranged to increase the effective usable area of the circuit board 3 and to improve the accuracy of the rotational center of the circuit board 39 by fitting the center opening 39 on the disc 2 which rotates with the rotational shaft 1.

More specifically, the circuit board 3 of this second embodiment has an increased effective area which is greater by 20% than that of the circuit board of the first embodiment, and therefore is capable of mounting a larger number of circuit elements thereon. In addition it is easier to control the dimensional accuracy of the center opening 39 of the circuit board 3 as compared with the diameter of its outer periphery, and a small clearance suffices to fit the board 3 on the disc 2. Therefore, the imbalanced rotation of the cylinder assembly which might occur as a result of mounting of the circuit board 3 can be suppressed to a minimum and corrected by an easy machining operation. In the second embodiment, the notches 36a to 36f at the outer periphery of the circuit board 3 and the wiring holes 34a to 34l are located substantially on the same circle, and the outer peripheral portions 55a to 55f only need to have dimensions which are necessary for forming the patterns around the wiring holes 34.

Figure 6:
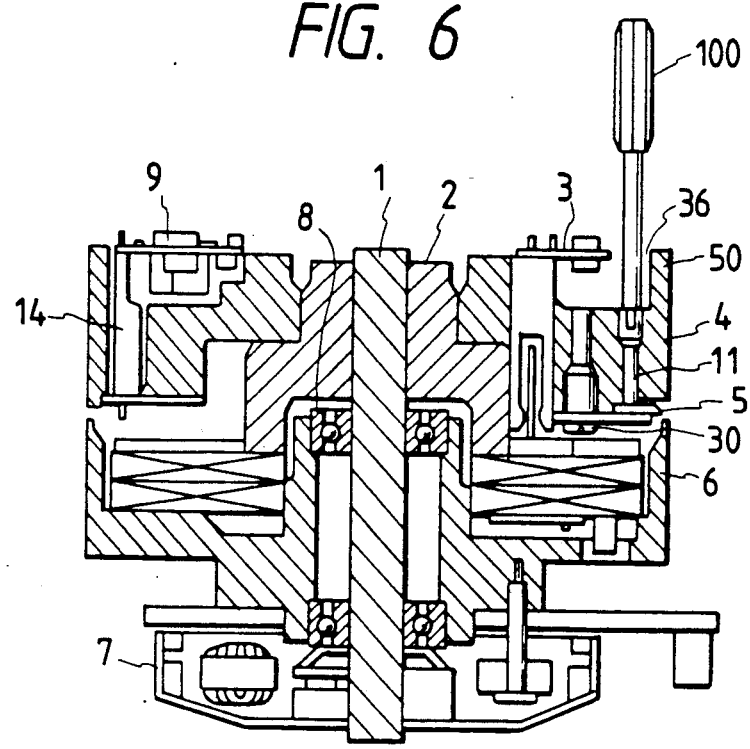
FIG. 6 is a sectional view taken on line X—X' of FIG. 1, showing the manner of adjusting the height of a magnetic head.

FIG. 6 shows the rotary head cylinder assembly of the invention in a sectional view taken along line X—X' of FIG. 1 to explain the manner of adjusting the height of one of the magnetic heads. Namely, the height of the magnetic head is adjusted by turning an adjusting screw 11 with a screwdriver which is inserted through a corresponding one of the notches 36a to 36e while measuring the height of the magnetic head laterally by means of a microscope (not shown). By this adjustment, each magnetic head can be set at an optimum height on the upper cylinder 4 of the rotary head cylinder which is in assembled state including the circuit board 3.

Figure 7:
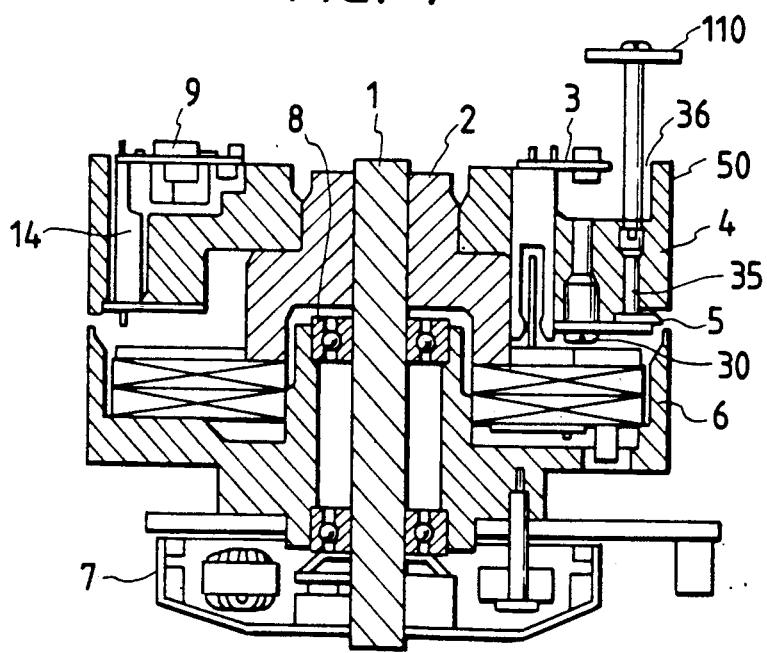
FIG. 7 is a sectional view taken on line X—Y of FIG. 1, showing the manner of making an adjustment for 180° indexing of a magnetic head.

FIG. 7 shows the rotary head cylinder of the invention in a sectional view taken on line X—Y of FIG. 1 to explain the manner of making an adjustment for 180° indexing of one of the magnetic heads by means of an eccentric pin 110 which is inserted in the corresponding one of the holes 35a to 35l in the upper cylinder 4. Thus, the adjustments for 180° indexing of the magnetic heads can be made through the circuit board 3 which is mounted on the upper cylinder 4.

It will be appreciated from the foregoing description that the rotary head cylinder construction according to the present invention permits to make the adjustments of the magnetic head height and 180° indexing without requiring removal of the circuit board which carries recording and playback amplifiers in the proximity of the respective magnetic heads to prevent interference by unnecessary signals. The arcuate notches at the outer periphery of the circuit board as well as the notched inner periphery conforming with the disc in size and shape serve as a positioning means when mounting the circuit board on the upper cylinder. Nevertheless, the upper cylinder can be detached from the disc together with the circuit board which is mounted on the cylinder.

What is claimed is:

1. A rotary head cylinder assembly including a lower cylinder for guiding travel of a magnetic tape, an upper cylinder rotatably mounted on said lower cylinder and provided with magnetic heads and height adjusting screws for said magnetic heads, and a circuit board fixedly mounted on said upper cylinder and supporting thereon amplifiers in positions in close proximity to said magnetic heads, characterized in that:

said circuit board is provided with notched portions at the outer periphery thereof in positions coinciding with the positions of said height adjusting screw of said magnetic heads on said upper cylinder.

2. A rotary head cylinder assembly according to claim 1, wherein said circuit board is provided with wiring patterns and wire threading holes in outer peripheral portions between said notched portions.

3. A rotary head cylinder assembly according to claim 1, wherein said circuit board is shaped arcuately at the outer periphery thereof except said notched portions and located on the inner side of a flange at the outer periphery of said upper cylinder.

4. A rotary head cylinder assembly including a lower cylinder for guiding travel of a magnetic tape, an upper cylinder rotatably mounted on said lower cylinder and provided with magnetic heads and height adjusting screws for said magnetic heads side by side with holes for adjusting positions of said magnetic heads, and a circuit board fixedly mounted on said upper cylinder and supporting thereon amplifiers in positions in close proximity to said magnetic heads, characterized in that:

said circuit board is provided with notched portions at the outer periphery thereof in positions coinciding with positions of said height adjusting screws and said magnetic head position adjusting holes on said upper cylinder.

* * * * *